Aug. 26, 1958 G. W. STREETER III 2,849,051
CONVERTIBLE WHEELED CHAIR
Filed Dec. 5, 1956 8 Sheets-Sheet 2
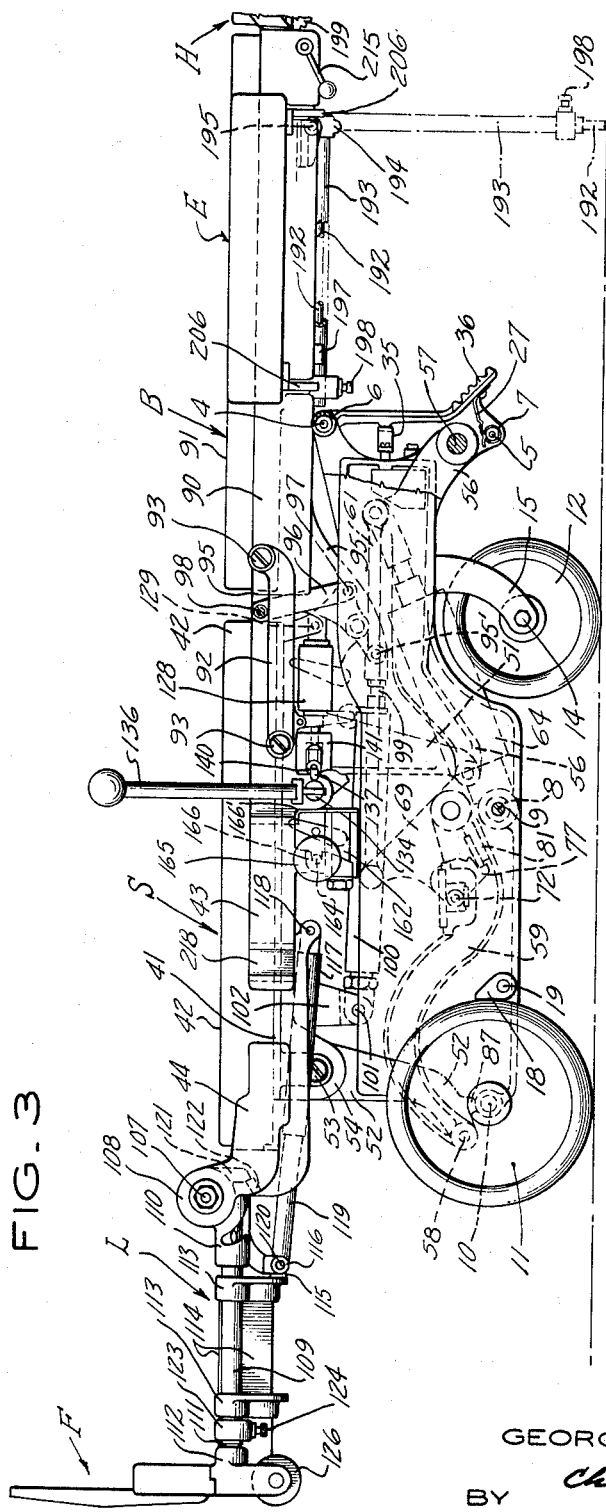
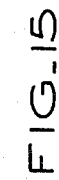
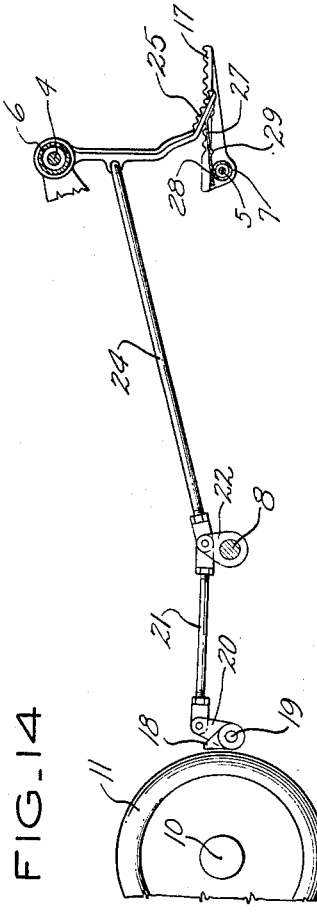
INVENTOR
GEORGE W. STREETER, III
BY Chapin & Neal
ATTORNEYS Aug. 26, 1958   G. W. STREETER III   2,849,051
CONVERTIBLE WHEELED CHAIR
Filed Dec. 5, 1956   8 Sheets-Sheet 3

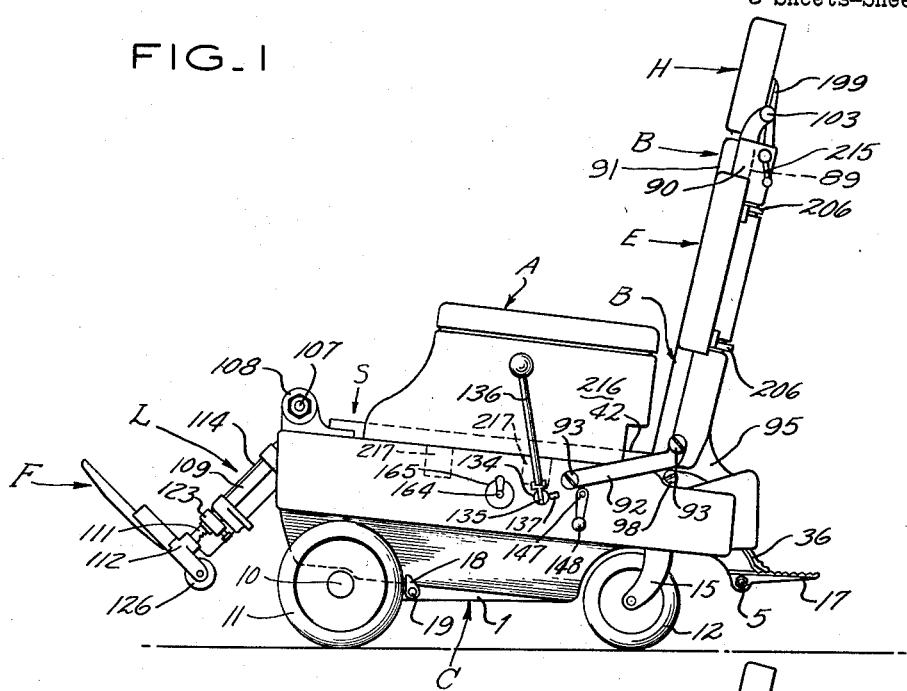
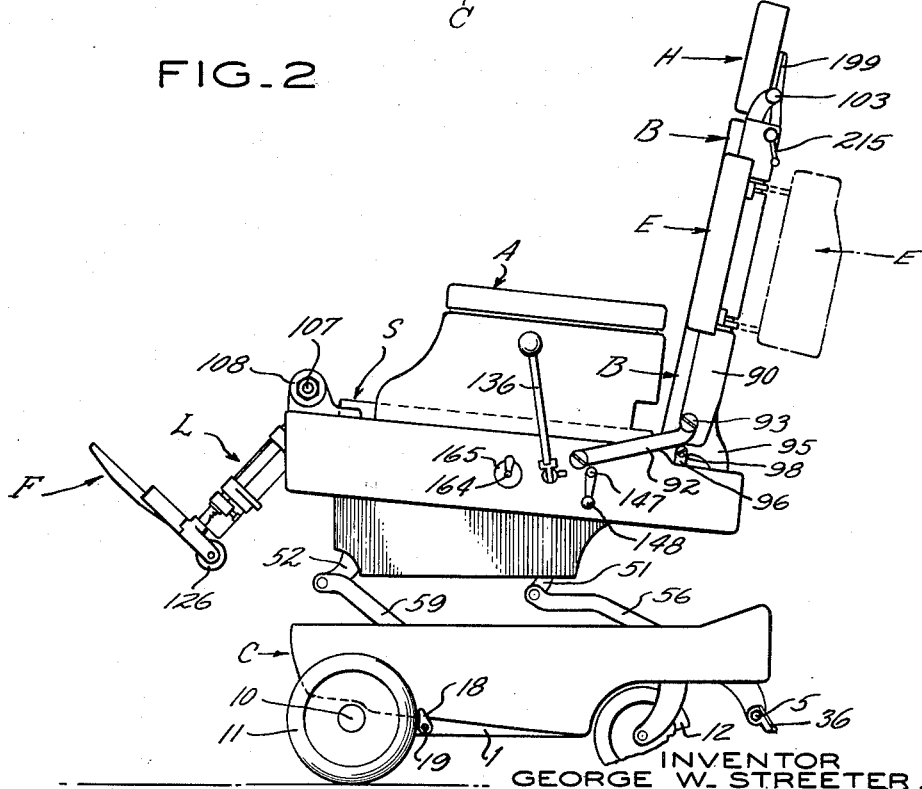

INVENTOR
GEORGE W. STREETER, III
BY  *Chapin & Neal*
ATTORNEYS

Aug. 26, 1958
G. W. STREETER III
2,849,051
CONVERTIBLE WHEELED CHAIR
Filed Dec. 5, 1956
8 Sheets-Sheet 4
FIG_6
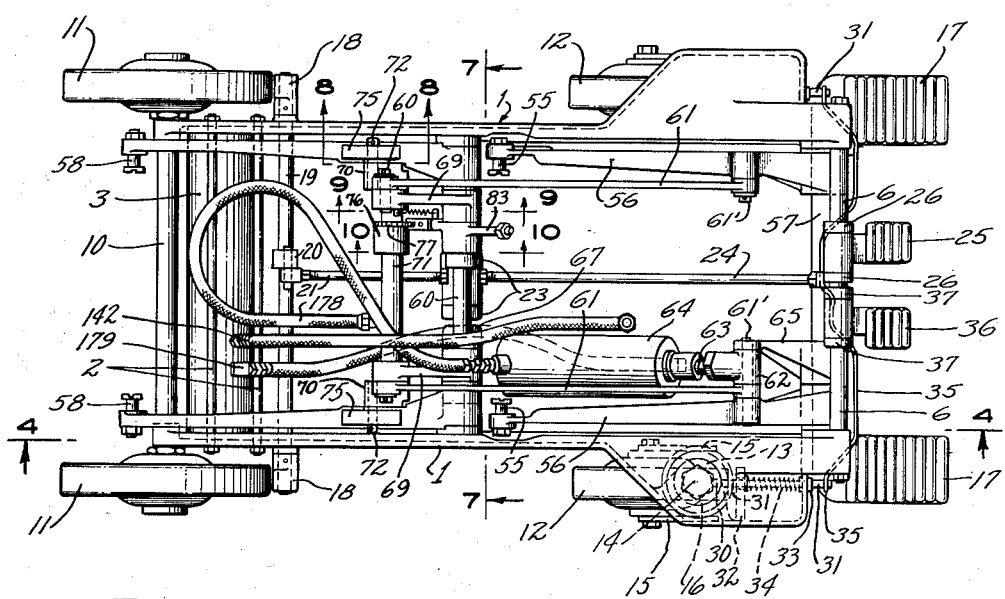
FIG_7
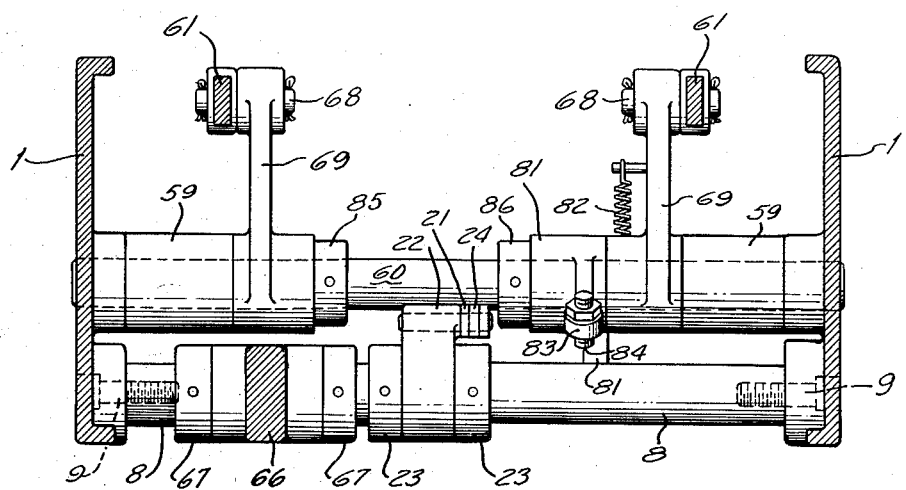
INVENTOR
GEORGE W. STREETER, III
BY *Chapin & Neal*
ATTORNEYS Aug. 26, 1958 — G. W. STREETER III — 2,849,051
CONVERTIBLE WHEELED CHAIR
Filed Dec. 5, 1956 — 8 Sheets-Sheet 5

INVENTOR
GEORGE W. STREETER, III
BY *Chapin + Neal*
ATTORNEYS

Aug. 26, 1958
G. W. STREETER III
2,849,051
CONVERTIBLE WHEELED CHAIR
Filed Dec. 5, 1956
8 Sheets-Sheet 6
FIG_12
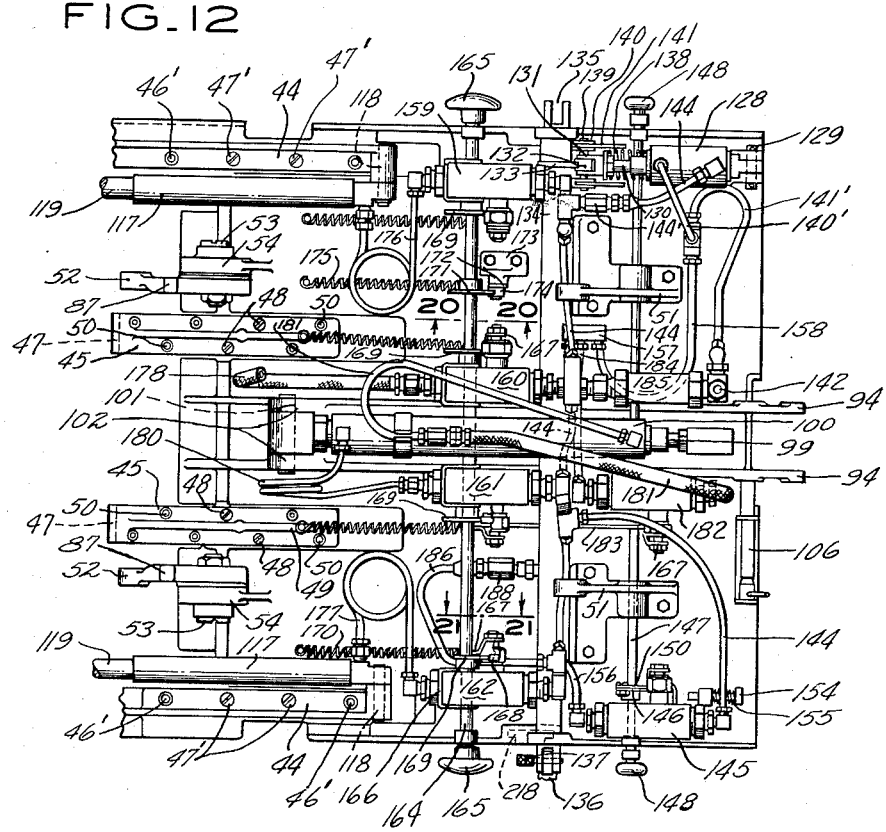
FIG_13
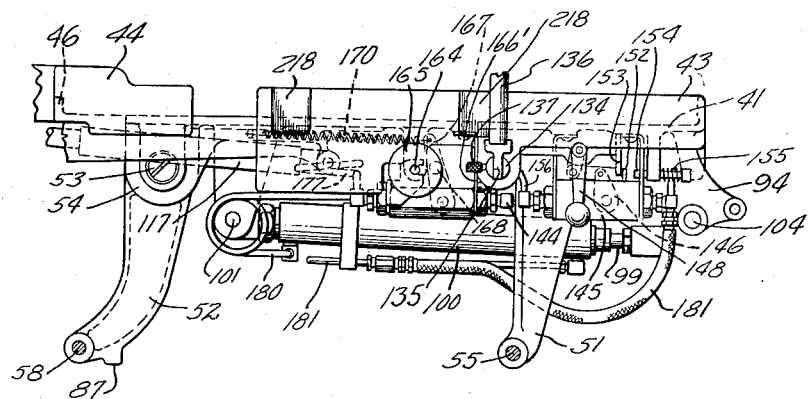
INVENTOR
GEORGE W. STREETER, III
BY *Chapin & Neal*
ATTORNEYS Aug. 26, 1958  G. W. STREETER III  2,849,051
CONVERTIBLE WHEELED CHAIR
Filed Dec. 5, 1956  8 Sheets-Sheet 7
FIG_16
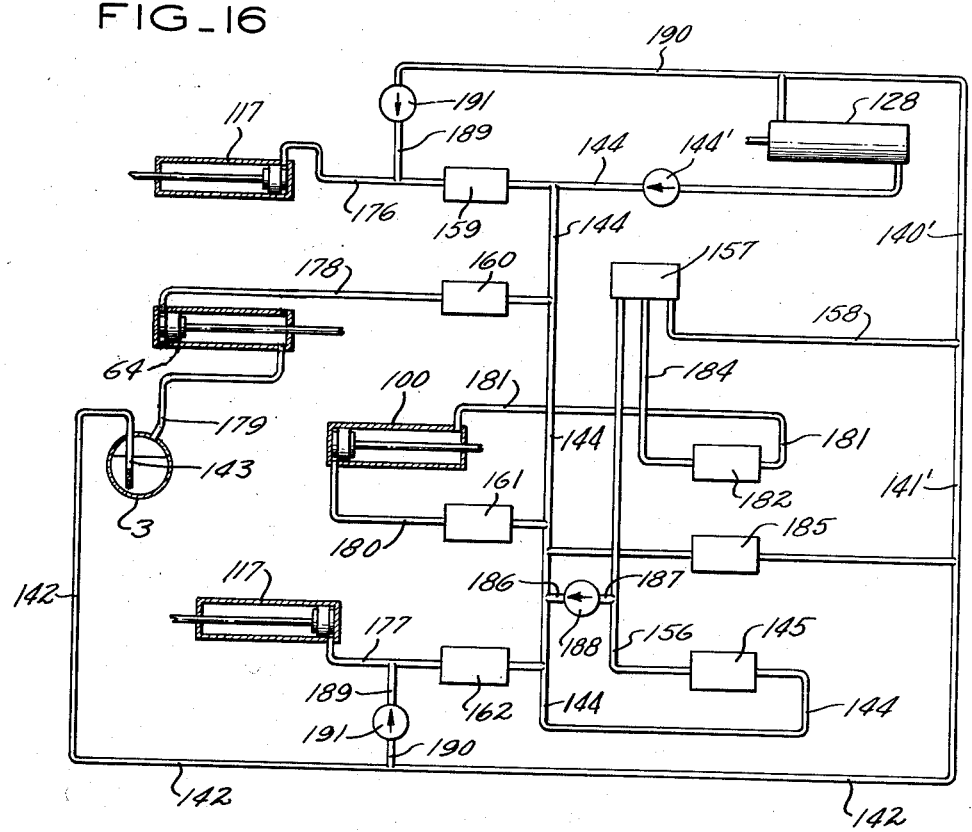
FIG.19
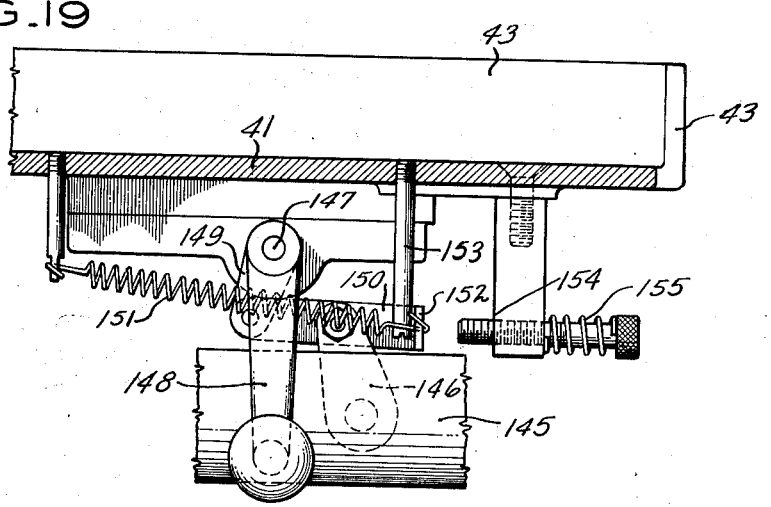
INVENTOR
GEORGE W. STREETER. III
BY *Chapin & Neal*
ATTORNEYS

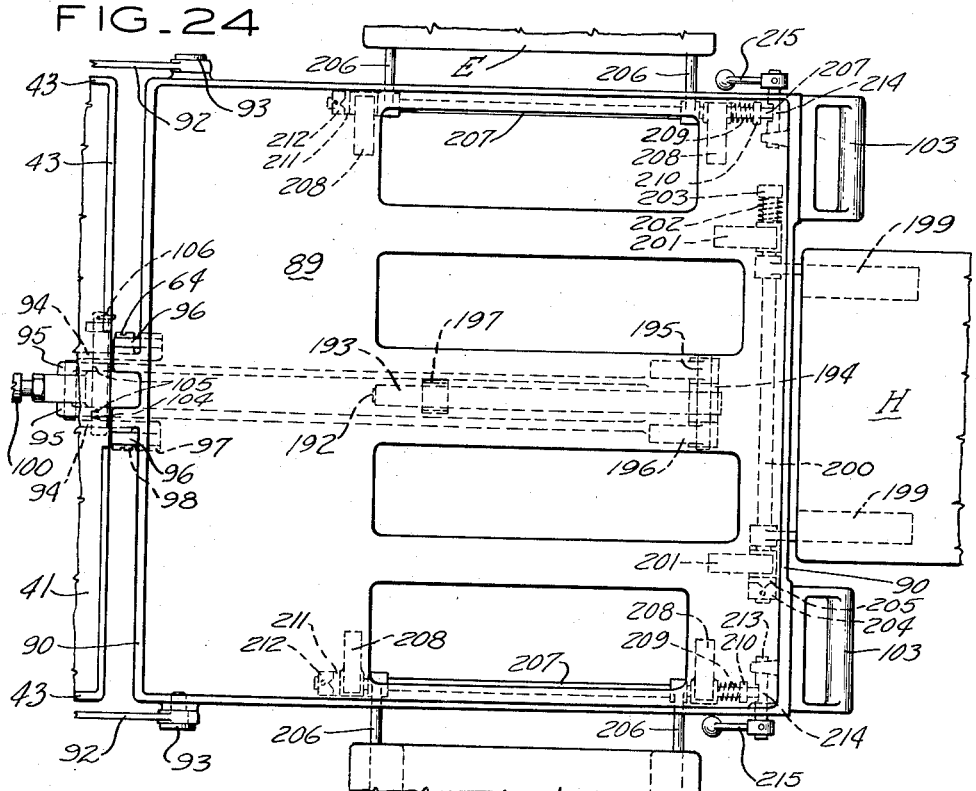
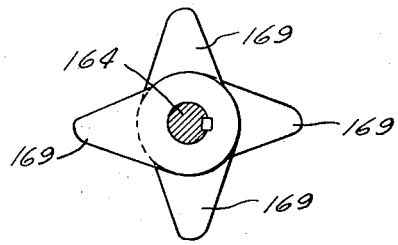
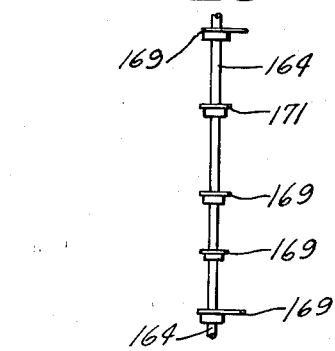
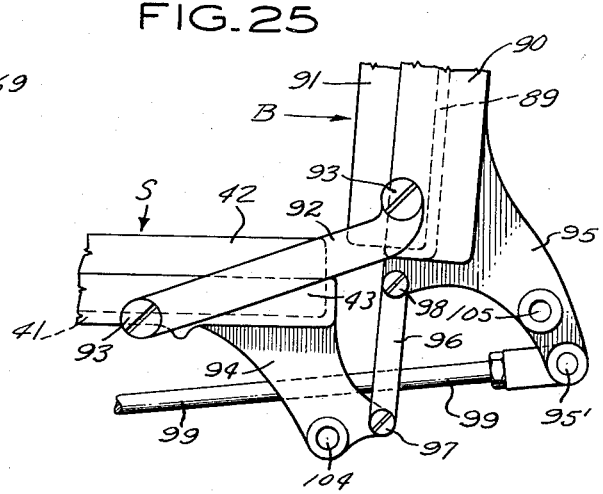

United States Patent Office 2,849,051
Patented Aug. 26, 1958

2,849,051

CONVERTIBLE WHEELED CHAIR

George W. Streeter III, Longmeadow, Mass.

Application December 5, 1956, Serial No. 626,523

13 Claims. (Cl. 155—30)

This invention relates to improvements in convertible wheeled chairs such as are adapted for use by weak, invalid or otherwise infirm persons.

In common with wheeled chairs of the prior art, the chair of this invention includes a seat which may be raised and lowered with respect to its supporting chassis, a back hingedly connected to the rear edge of the frame of the seat, and leg rests hingedly connected to the front edge of the frame of the seat. The back, leg rests and seat may be moved into one common horizontal frame to convert the chair into a stretcher or litter and the leg rests and back may be adjusted to different inclinations with respect to the seat.

The general object of this invention is to provide in a chair of the general class defined, improvements, whereby the occupant of the seat may completely control all the movable elements of the chair and adjust each to his own personal satisfaction.

A particular object of the invention is to provide in a chair of the general class defined, a plurality of hydraulic jacks for raising the various movable elements of the chair and to provide a selective control, whereby the occupant of the seat can actuate the jacks independently, connecting any desired jack to a single source of hydraulic pressure such as a pump, in order to raise the selected element and releasing the pressure from the selected jack to lower the selected element.

Another object of the invention is to provide in a chair of the class described, a plurality of hydraulic jacks connected by branch conduits to a distributing conduit, a valve in each branch conduit, a pump operable by an occupant of the seat to supply hydraulic pressure to the distributing conduit, and a normally-closed pressure-release valve connected to the distributing conduit, together with controls on the seat frame operable by an occupant of the seat to selectively open or close the valves in the branch conduits and to open and close the pressure release valve.

Another object of the invention is to provide in a chair of the class described, mechanism for raising and lowering the seat of the chair that enables the seat to be moved from a horizontal position to a rearwardly tilted position and back again at the will of the occupant of the seat.

A further object of the invention is to provide in a chair of the class described, having a back which is hingedly connected to the seat and which is pushed against by an attendant when wheeling the patient, hydraulic means for raising the back and hydraulic means for holding the back in any position to which it may be raised against any force exerted by an attendant pushing on the back.

A further object of the invention is to provide in a chair of the class described, a leg rest and a hydraulic jack for raising it together with relief means to prevent the formation of a vacuum in the jack in case the leg rest is manually raised.

Other objects and advantages will appear in the following detailed description of the one illustrative embodiment of the invention shown in the accompanying drawings, in which:

Fig. 1 is a side elevational view of a convertible chair embodying the invention, the seat being shown in lowered and rearwardly tilted position with the back raised and the leg rests lowered;

Fig. 2 is a similar view except that the seat is shown as raised;

Fig. 3 is a side elevational view drawn to a larger scale and showing the chair converted to a stretcher with back, seat and leg rests all in a common horizontal plane;

Fig. 6 is a plan view of the chassis;

Fig. 7 is a cross sectional view taken on the line 7—7 of Fig. 6;

Fig. 12 is a bottom plan view of the seat frame;

Fig. 13 is a side elevational view of the seat frame;

Fig. 14 is a sectional elevational view illustrative of the wheel braking mechanism;

Fig. 15 is a fragmentary sectional view showing the means for holding the caster wheel pedal in its operating positions;

Fig. 16 is a diagrammatical view of the hydraulic system;

Fig. 19 is a fragmentary sectional elevational view of the release valve operating means;

Fig. 22 is a cross sectional view showing the valve operating cams;

Fig. 23 is a fragmentary plan view of the valve operating shaft showing a modification in the arrangement of the cams;

Fig. 24 is a top plan view of the back frame and its connections with the seat frame, elbow rests and head rests; and Fig. 25 is a fragmentary elevational view showing the back-raising means positioned to hold the back in raised position.

Figure 18:
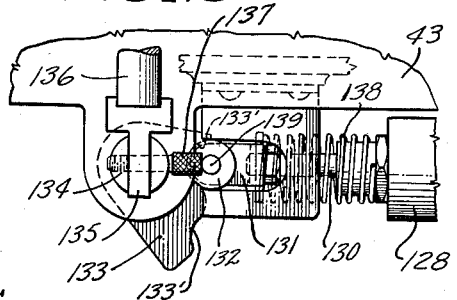
Fig. 18 is a fragmentary elevational view of the pump operating means.
Figure 20:
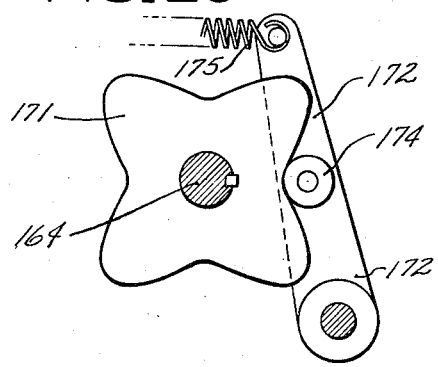
Fig. 20 is a fragmentary sectional elevational view taken on the line 20—20 of Fig. 12 and showing the detent for holding the valve shaft in its several operating positions.

Referring to these drawings, and first to Fig. 1 thereof, the convertible chair includes a low-lying mobile chassis C; a seat S; usually provided with arm rests A; mechanism on the chassis including a hydraulic jack (shown in detail in Figs. 4 and 5) for raising the seat to the position shown in Fig. 2 under the control of an occupant of the seat and preferably including means whereby the seat may be tilted downwardly toward the back when desired as illustrated; a back B (Fig. 1) hingedly connected to the back of seat S and including a head rest H and elbow rests E; leg rests L hingedly connected at one end to the front of seat S and having at their other end foot rests F; hydraulic jacks (shown in detail in Fig. 3), one for moving the back B relatively to the seat and others for moving the leg rests L relatively to the seat; a pump (shown in Figs. 12 and 18) operable by an occupant of the seat for supplying liquid under pressure to a distributing conduit; a pressure release valve (shown in detail in Figs. 12 and 19) connected to the distributing conduit and operable by an occupant of the seat; and means (shown in detail in Figs. 12, 20 and 21) operable by an occupant of the seat for selectively connecting the several jacks to said distributing conduit, whereby liquid under pressure may be supplied to any selected jack or released therefrom; said jacks enabling the seat, back and leg rests to be raised into a common horizontal plane with said seat as indicated in Fig. 3 to serve as a stretcher and enabling the back and leg rests to be moved into various positions of angular adjustment relatively to the seat for use as a chair.

The chassis (Fig. 6) consists of two longitudinally-disposed side frames 1 which are held together in laterally-spaced relation by a series of tie bolts and suitable spacing means. Near the front end of the chassis are three tie bolts 2, and between them (see also Fig. 4) is a storage tank 3, which is adapted to contain hydraulic fluid and which also serves as a spacer, opposite ends of the tank abutting the confronting inner faces of the side frames. Near the rear end of the chassis are upper and lower tie bolts 4 and 5 (Fig. 3) which extend through spacing tubes 6 and 7, respectively. Centrally of the frames 1 is a rod 8, the ends of which as shown in Fig. 7 abut one with each of the confronting inner faces of the side frames 1 and are clamped thereto by screws 9. Suitably fixed to the side frames 1 near their front ends is an axle 10, for rotatably supporting on its outer ends in any suitable manner a pair of wheels 11. At its rear end, the chassis is supported by a pair of caster wheels 12. Each side frame 1 near its rear end extends outwardly and upwardly from the rest of the frame and affords an ear 13 (Fig. 6) in which the stud 14 of a caster wheel is fixed. Each caster wheel fork 15 has a cylindrical hub 16, which is mounted to turn relatively to its stud 14. The lower rear portion of each side frame 1 has a rearwardly and horizontally extending part forming a foot pedal 17. By pressing on the right or left pedal, whichever is most convenient, the front end of the chassis may be elevated to facilitate its passage over a curbstone or other obstruction.

Braking means are provided on the chassis for the front wheels 11. Such means includes a pair of brake shoes 18 (Fig. 6), one for each wheel 11 and fixed one to each outer end of a shaft 19, which is rotatably mounted in bearings provided in the side frames 1 and extends across between the same. Fixed to this shaft intermediate its ends is an upstanding lever 20 which is connected by a link 21 to a similar lever 22. The latter is mounted to turn on the described spacer rod 8 (Fig. 7) and is held against axial displacement thereon by and between a pair of collars 23 fixed to rod 8. The lever 22 is connected by a link 24 (Fig. 6) to a brake pedal 25, which is mounted to turn on the described spacer tube 6 and is held against axial displacement thereon by a pair of collars 26 fixed to such tube. The pedal 25 has fixed to its lower face a flat spring 27 which extends forwardly to the spacer tube 7 and is bent to form two shoulders 28 and 29 either of which may engage in a notch in tube 7. The arrangement is best shown in Fig. 14. The outer shoulder 28 is shown as engaged with the notch in tube 7, whereby the pedal is held in "off" position and against rattling. When pedal 25 is depressed to force the brake shoes 18 against wheels 11, the spring will move forwardly and shoulder 29 will engage in the notch in tube 7 and hold the brakes in "on" position. The brakes are released by upward pressure of the operator's toe on the under side of pedal 25.

Means are also provided for holding the caster wheels against swivelling in parallel relation with the front wheels 11. The hub 16 (Fig. 6) of the fork 15 of each caster wheel 12 has a radial hole 30 into which the inner end of a locking bolt 31 may be thrust, when the wheel is positioned as described. Each bolt 31 is slidably mounted in a lug 32 on its frame 1 and in a bushing 33 fixed in an adjacent end wall of such frame. Each bolt has thereon a spring 34 which acts between the lug 32 and a shoulder on the bolt and tends to hold the bolt in the retracted position illustrated. The two locking bolts are actuated against the force of their retracting springs 34 by means of a strip 35 of resilient metal, which strip extends across from one bolt to the other and has holes to receive the outer ends of the bolts. These ends are of reduced diameter, forming shoulders against which the strip abuts. An operating pedal 36, which has its hub mounted to turn on tube 6 and held between a pair of collars 37 fixed to such rod, has a vertically-depending part (Fig. 3), which abuts the strip 35 at a location intermediate its ends. A flat spring 38 (Fig. 15), fixed to the underside of pedal 36 extends forwardly and has two shoulders 39 and 40 either of which may be engaged with a notch in tube 7. These shoulders 39 and 40, when engaged with the notch in tube 7, hold the pedal 36 in off and on positions, respectively. When the pedal 36 is pressed inwardly, the resilient cross member 35 will be placed under stress with its outer ends (Fig. 6) tending to thrust the locking bolts 31 inwardly against the force of their springs 34. The holes 30 in the hubs 16 of the caster wheel forks 15 may not align with the bolts 31 but usually by a sidewise thrust back and forth on the chassis, these parts 16 will be moved to bring the holes 31 and bolts 34 into alignment, whereupon the bolts will be thrust into the holes as described to lock the caster wheels. The pedal 36 is moved from wheel locking to wheel unlocking position by upward pressure of the operator's toe on the under side of the pedal.

The seat comprises a frame 41 (Fig. 3) having a flat upper face, upon which rests a cushion 42, and having along the back and both sides an upstanding marginal flange 43 to confine the cushion. At the front end of frame 41 are two outer side members 44 and between them, other members 45 (Fig. 12). These members 44 and 45 have upturned outer ends 46 and 47, respectively, for engaging the front end of the cushion 42. These members 44 and 45 may be secured to frame 41 in various positions of longitudinal adjustment. For example, each member 44 has a series of equally spaced holes 46′, any adjacent pair of which may receive screws 47″ that clamp the members to frame 41. It will be clear that the member 44 may be moved to the right or the left of the illustrated position. The members 45 are adjustably connected to frame 41 in a similar manner but the two bolts 48 are disposed on opposite sides of a central rib 49 and a series of three holes 50 are provided in the member on each side of the rib. The seat frame 41 (Figs. 3 and 12) has fixed to its lower face near its rear end a pair of laterally-spaced and depending brackets 51. Near its front end the frame 41 has connected thereto two other laterally-spaced depending brackets 52, which are aligned one with each of the rear brackets 51. Each front bracket, however, is pivotally connected by means of a stud 53 to an ear 54 on the lower face of the seat frame. These brackets 51 and 52 are the means by which the seat frame is supported from the chassis in a manner to enable lifting and lowering the seat with respect to the chassis.

The hydraulic means for raising the seat S and its connected parts will next be described. The rear pair of depending brackets 51 (Figs. 3, 4 and 6) are pivotally connected by studs 55, one to the outer end of each of a pair of rear levers 56. These rear levers at their other ends are fixed to a first cross shaft 57 located near the rear of the chassis and suitably journalled at its outer ends, one in each of the side frames 1. The front pair of brackets 52 are pivotally connected by studs 58, one to the outer end of each of a pair of front levers 59, the other ends of which are pivotally mounted to turn on a second cross shaft 60 located forwardly of the first cross shaft. This shaft 60 is mounted at its ends in bearings provided one in each side frame 1. These front levers 59 are actuated from the back levers 56 by means which include a pair of links 61 each pivotally connected by a pin 61′ to the adjacent back lever 56. It will be noted from Fig. 6 that one of the pins 61′ is extended through a head 62 on the outer end of the piston rod 63 of a hydraulic jack, the cylinder of which is designated 64, and through a second and shorter lever 65 which is fixed to the rear cross shaft 57. The cylinder 64 at its other end has a head 66 which is mounted to turn on the shaft 8 (Fig. 7) and is held in axial position by and between a pair of collars 67 fixed to this shaft. Each link 61 is pivotally connected by a pin 68 to the upper end of a second lever 69 and these second levers are mounted to turn on the second cross shaft 60 one adjacent each front lever 59.

Figure 8:
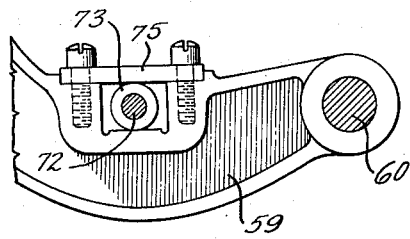
Fig. 8 is a fragmentary sectional elevational view taken on the line 8—8 of Fig. 6.
Figure 9:
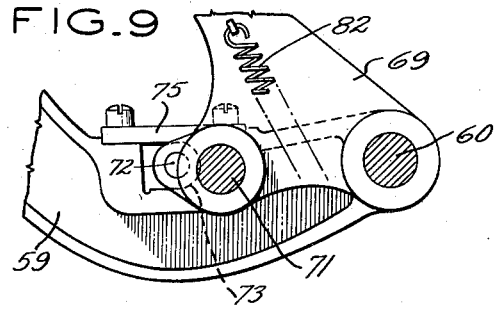
Fig. 9 is a fragmentary sectional elevational view taken on the line 9—9 of Fig. 6.

Each front lever 59 and each second lever 69 is interconnected by means which enable them to move relatively under certain conditions when desired. The two levers 69 are interconnected by a crankshaft 71 (Figs. 4, 5 and 6) having a bearing in each lever and projecting beyond the levers to carry cranks 70 suitably fixed one on each end of the crankshaft. The pin 72 of each crank 70 (Fig. 8) preferably carries a roll 73 to ride in a slot 74 in the adjacent front lever 59. The roll bears on the bottom and top walls of the slot 74 but may move longitudinally as much as necessary. The top wall of each slot 74, as shown, consists of a plate 75 secured as indicated to the lever. Fixed to the crankshaft 71 intermediate its ends is an arm 76 (Figs. 6 and 10) and a plate 77, also on the crankshaft, abuts this member (Fig. 10) and is secured thereto by a screw 78. The lower edge of plate 77 has two ratchet teeth 79 and 80 located at different radial distances from the axis of the crankshaft. Cooperating with these teeth is a pawl 81, which is mounted to turn on shaft 60 and is connected to the adjacent lever 69 by a spring 82. The pawl and ratchet limit the turning movement of the crankshaft 71 and thus the relative movement between the levers 59 and 69. This pawl 81 has a rearwardly extending arm 83, in which is mounted a stop screw 84. This screw is adapted to engage shaft 8 which forms a stop and limit the clockwise movement of the pawl as the levers 56 and 59 swing upwardly to raise the seat. The hubs of the left hand levers 59 and 69 (Fig. 7) abut and are held axially between a collar 85 on shaft 60 and a hub on the adjacent frame 1. The hubs of the right hand levers 59 and 69 and the hub of pawl 81 abut and are held axially between a collar 86 on shaft 60 and a hub on the adjacent frame 1. The front brackets 52 (Figs. 3 and 4) have near their lower ends projections 87 which when the seat is lowered, are adapted to abut axle 10 which forms a stop and limit their downward movement.

Figure 4:
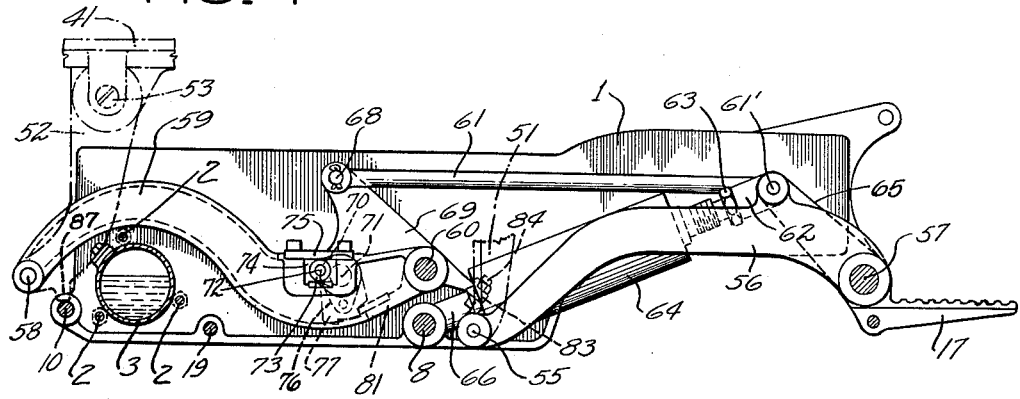
Fig. 4 is a sectional elevational view taken on the line 4—4 of Fig. 6 and illustrative of the seat raising mechanism with the seat shown lowered and horizontal.
Figure 5:
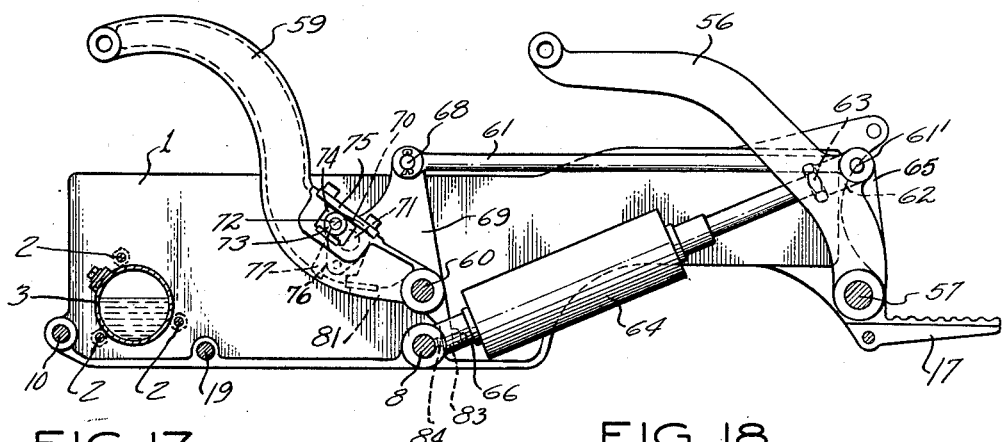
Fig. 5 is a view taken similarly to Fig. 4 but showing the seat raised.
Figure 10:
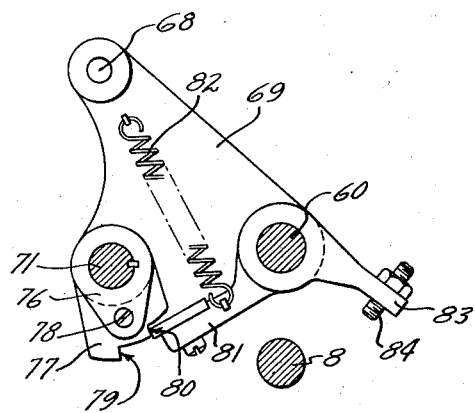
Fig. 10 is a fragmentary sectional elevational view taken on the line 10—10 of Fig. 6.
Figure 11:
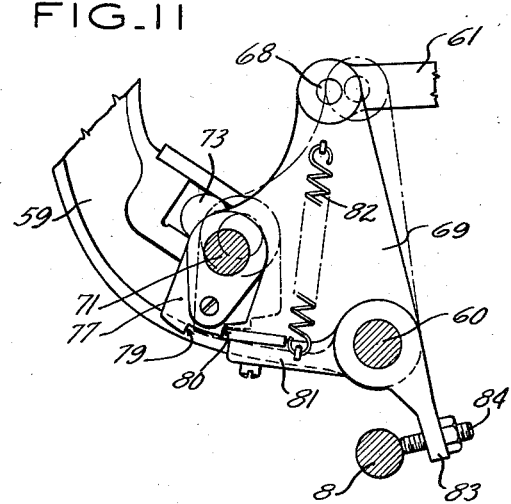
Fig. 11 is a view taken similarly to Fig. 10 but showing the parts in seat-elevating position.

Assuming that the seat S has been lowered to the position illustrated in Fig. 3 and 4 and that the projections 87 have been engaged with axle 10, whereby the front end of the seat has been lowered as much as possible the levers 69 and the back levers 56, which are connected thereto, can continue to move in the same direction and thereby lower the rear brackets 51, causing the seat to turn on its pivots 53 and tilt rearwardly toward back B. The weight of the seat and connected parts will tend to move levers 56 counterclockwise and this is permitted by the crank connections between the levers 69 and 59. The crank pin and roll 73 are stationary in the Fig. 4 position but the crankshaft 71 can swing about the axis of the crank pins. This will cause the crankshaft to turn clockwise as viewed in Fig. 4 and move the plate 77 until the pawl 81 engages tooth 80, as shown in Fig. 10, whereby the downward movement of the rear end of seat S is arrested. Subsequently, if the jack is actuated to raise the seat, the levers 56 and 59 will swing upwardly and raise the seat, while still tilted, to such position as desired within the range of the jack. However, if one wishes to move the seat back into flat or horizontal position, this is effected by continuing to supply hydraulic pressure to the seat jack after the stop screw 84 has engaged shaft 8 as shown in Fig. 11. The pawl now remains stationary while the second levers 69 continue to swing clockwise, from their full line to the dotted line positions. This raises the crankshaft 71 and with it the plate 77. As the crankshaft is raised, it has to turn counterclockwise and this swings the plate 77 moving it up and over the end of the pawl, releasing the latter from tooth 80 and finally causing it to engage against the tooth 79 as indicated by dotted lines in Fig. 11. The turning of the crankshaft 71 and cranks 70 enables the second levers 69 to swing clockwise far enough to cause the back levers 56 to raise the back seat brackets 51 far enough so that the seat S becomes horizontal.

The back will next be described with special reference to Figs. 3, 24 and 25. It consists of a flat frame 89 having an upstanding marginal flange 90 forming a rectangular box-like enclosure to receive a cushion 91. Each side flange 90 is connected to the corresponding side flange 43 of the seat frame by a link 92 and studs 93 as indicated. Centrally of the back flange 43 of the seat are two laterally-spaced depending arms 94, and centrally of the lower flange 90 of the back are two laterally-spaced depending arms 95. A pair of links 96, pivotally connected by studs 97 to the lower ends of arms 95 are pivotally connected by studs 98 to the upper portions of arms 94. These links lie outside the arms to which they are connected. The lower ends of arms 95 receive between them the outer end of the piston rod 99 of a hydraulic jack. Such end is pivotally connected to arms 95 by a stud 95′. The cylinder 100 of the jack is pivotally connected by a pin 101 to a pair of lugs 102 (see also Fig. 12), depending from frame 41. Liquid under pressure may be forced into the left hand end of this cylinder to raise the back from a position in which it is co-planar with the seat, as shown in Fig. 3, to a position such as shown in Figs. 1 and 25. Pressure may be released from such end of this cylinder 100 to lower the back. The arms 94 and 95 (Fig. 25) have holes 104 and 105, respectively, therein and these holes register when the back is in flat position and are adapted to receive a slidable locking bolt 106 (Fig. 24) whereby the back and seat may be locked against relative movement. Handles 103 are provided on the rear flange 90 of frame 89 for pushing the chair.

Figure 17:
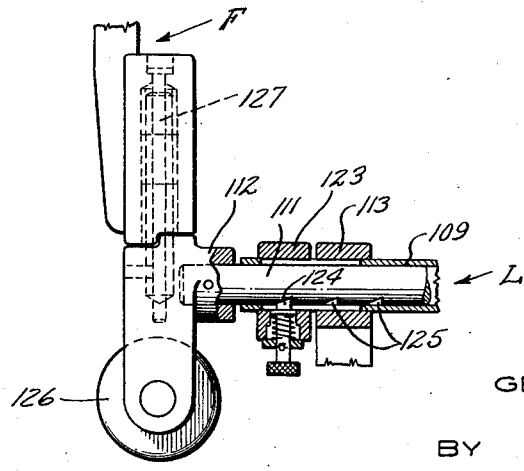
Fig. 17 is a fragmentary sectional view showing the length adjustment for a leg rest.

There are two leg rests L, preferably independently operable. Since both are alike a description of one will suffice. Each leg rest includes a frame member (Fig. 3) pivoted at one end by means of a stud 107 to an ear 108 which upstands from the front flange 46 of the extensible side member 44 of the seat frame. This frame member is preferably longitudinally extensible. As herein shown, such member comprises a tube 109 fixed at one end in a socket member 110 that receives the stud 107, and a rod 111 which telescopes in part in the tube and has fixed at its outer end a member 112. Turnable on each tube 109 are two arms 113 to which a cushion 114 is suitably attached. A stop 115 on one arm 113 engages the inner face of a fork 116 which depends from member 110, and holds the cushions 114 in active position. Each cushion can be swung upwardly into an inactive vertical position to allow access to seat S. The leg rest normally hangs downwardly but may be raised to various inclinations and into the horizontal position shown in Fig. 3, wherein its cushions 114 are coplanar with the seat cushion 42. Each leg rest may be moved by means of a hydraulic jack, the cylinder 117 of which (Figs. 3 and 12) is pivoted at one end at 118 to an adjustable side member 44, and the piston rod 119 of which emerges from the other end of this cylinder and is pivotally connected at 120 to the member 116. The means for admitting hydraulic fluid to the two cylinders 117 and releasing such fluid from the latter will be later described. The lower limit of movement of the leg rest is limited by the piston of its jack, when the piston is in its innermost position. The upward movement of the leg rest is limited by the abutment of a lug 121 on socket member 110 with a lug 122 on member 108. The tube 109 (Fig. 17) has fixed thereon a collar 123 in which is slibably mounted for movement radially of the tube a detent 124 which is spring-pressed inwardly through a slot in the tube into any one of a series of ratchet teeth 125 formed in rod 111. By pulling outwardly on the detent, rod 111 is released and can be pulled outwardly to extend the leg rest. To contract the leg rest, it is simply necessary to push in on rod 111. The member 112 on rod 111 preferably carries a small wheel 126 to assist the leg rest in riding over obstructions.

Each leg rest L also carries the usual foot rest F which is pivoted by a stud 127 to member 112 and may be manually swung on such pivot from the active position shown through an angle of 90° to an inactive position.

Liquid under pressure is selectively supplied to the cylinders of the several jacks described by means of a pump located beneath the seat frame and having a cylinder 128 (Fig. 12), which is pivoted at 129 to such frame. The piston rod 130 of this pump bears on its outer end a fork 131 (Fig. 18), which carries a roll 132 that rides on the periphery of a cam 133. This cam is suitably fixed to a shaft 134, which extends across the bottom of the seat frame (Fig. 12) and is rotatably supported in suitable bearings provided in such frame. This shaft projects beyond each side of the seat frame and each projecting end is slotted, as at 135, to receive the lower end of a pump handle 136. This handle may be connected to either end of the shaft by means of a pin 137. A spring 138 tends to hold the roll 132 engaged with the cam. This roll is carried on a pin 139 which also bears, one on each side thereof, a flanged wheel 140 (Fig. 12) riding on tracks in a guide member 141. The cam (Fig. 18) has at each end of its effective periphery two stop portions each consisting of an arcuate surface 133' of the same radius as roll 132. The roll is shown engaged with the upper surface 133'. The inlet of the pump is connected by tubing 140' and 141' and a flexible tube 142 (Fig. 16) to the suction pipe 143 of the described storage tank 3 which pipe, as indicated, extends nearly to the bottom of the tank. The outlet of the pump is connected to a distributing conduit 144 which has a non-return valve 144' therein and which extends transversely of the seat frame and is adapted to be connected by valves to the several jacks described.

This conduit 144 is also connected to the inlet of a release valve 145, supported as indicated from the bottom of the seat frame, and having an operating crank 146 (Fig. 19). A shaft 147 (Fig. 12) extends across the bottom of the seat frame and projects beyond each side thereof, being supported in suitable bearings on such frame as indicated. Each projecting end of shaft 147 has fixed thereto a crank 148 which is accessible to the occupant of the seat. Shaft 147 (Fig. 19) has fixed thereto a crank 149 which is connected by a link 150 to the valve crank 146. A spring 151 fixed at one end to the seat frame has its other end connected to an out-turned extension 152 of link 150 and holds the latter against a stop pin 153 depending from the frame. The release valve is then closed. It may be opened by moving handle 148 in a counterclockwise direction until the extension 152 abuts the inner end of a stop screw 154, threaded in a lug depending from the seat frame. A spring 155 tends to hold stop screw 154 in its various positions of adjustment. The outlet of the release valve is connected to communicate with tank 3 below the level of liquid therein. As shown in Fig. 16, this connection is effected by a tube 156 leading to a manifold 157 from which a tube 158 extends to tube 141' and thus to tube 142 and the suction pipe 143 of tank 3. The entire system is always filled with the hydraulic liquid.

The distributing conduit 144 is connected at a location beyond the non-return valve 144' to a plurality of branch conduits having interposed therein a series of valves 159, 160, 161 and 162 which respectively control the admission of fluid under pressure to, and the release of such fluid from, the jack for raising the right hand leg rest L; the jack for raising seat S; the jack for raising the back B; and the jack for raising the left hand leg rest L. All these valves are controlled from a single shaft 164 (Fig. 12) which extends transversely across and is rotatably mounted near its ends in bearings in the flanges 43 of the seat frame 41 and which project beyond these side flanges to carry knobs 165, fixed thereto, and accessible for actuation by the occupant of seat S.

Figure 21:
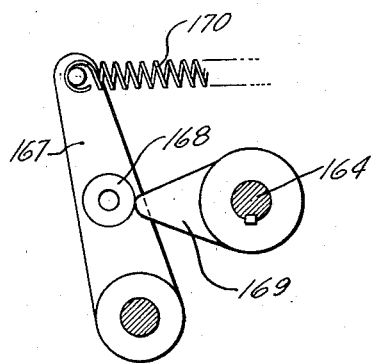
Fig. 21 is a fragmentary sectional elevational view of the valve operating means taken on the line 21—21 of Fig. 12.

All these valves are alike and a description of one will suffice for all. Each valve has fixed thereto a U-shaped bracket 166 (Fig. 12) having near the upper end of each side a slot (Fig. 13) to fit over the valve shaft 164. To the other end of the valve is fixed a bracket 166', the upper end of which is fixed to the bottom of frame 41. The valve has an actuating lever 167 (Fig. 13), carrying a roll 168 to ride on the periphery of a cam 169, fixed to shaft 164. A spring 170 tends to hold the roll engaged with the cam. The cam contour is shown in Fig. 21. It has a sharp rise and fall and a dwell of 270°. The four cams 169 are set 90° apart on the shaft 164 as indicated in Fig. 22. To assist the occupant of the seat in turning shaft 164 to the proper angular positions for effecting the various functions, a cam 171 (Fig. 20), having four lobes spaced 90° apart and four intervening low spots also spaced 90° apart, is fixed to shaft 164. A lever 172 pivoted at one end to a bracket 173 on the seat frame and carrying on its other end a roll 174 is urged by a spring 175 to hold roll 174 engaged with cam 171. The cam is so set on shaft 164 that when roll 174 is engaged with any one of the four described low spots of the cam, some one of the valves will be open. The occupant can tell by counting the clicks as the roll rides off a lobe of the cam onto the adjacent low spot, which valve is open.

Should it be desired to raise both leg rests L simultaneously, the two cams 169, which actuate valves 159 and 162, may be set to the same angular position on shaft 164, as indicated in Fig. 23.

The valves 159 and 162 (Figs. 12 and 16) are respectively located in branch conduits 176 and 177 leading to the cylinders 117 of the jacks for raising the right and left leg rests L. The valve 160 (Fig. 12) is located in branch conduit 178 which includes a flexible portion and is connected to the rear end of the cylinder 64 of the seat raising jack. The front end of cylinder 64 is also connected to the upper part of tank 3 by means of a flexible tube 179 in order to vent that end of the cylinder and dispose of any leakage past the piston of the jack. The valve 161 is located in a branch conduit 180 which is connected to the rear end of the cylinder 100 of the jack for raising back B.

The front end of cylinder 100 is connected by a conduit 181 to one outlet of a valve 182 which is similar in all respects to the cylinder valves, above described, and is secured as indicated to the bottom of frame 41. Valve 182 has its operating crank 167 (Fig. 12) connected by a link 183 to the operating crank 167 of the valve 161. These valves 161 and 182 open and close in unison. The other outlet of valve 182 (Fig. 16) is suitably connected to the return conduit as by a tube 184 extending to the described manifold 157 and thus through tubes 158, 141' and 142 to the suction pipe 143 of tank 3.

These valves 161 and 182 allow the cylinder 100 on both sides of its piston to be maintained filled with oil. When these valves are closed the piston will be locked in position and the back B will be held firmly in any desired position of inclination against movement by a person pushing on the back in order to propel the chair. The back may also be locked in horizontal position by this same means instead of using the locking bolt 106. If valve 182 were omitted, a push on the back B could move the piston in the cylinder 100 and create a vacuum therein which might vaporize the hydraulic fluid, which is preferably an oil. Then, when the back is released it would suddenly snap back to the discomfort of the occupant of seat S and possible injury to the one who was pushing the chair. By maintaining the cylinder filled with liquid on both sides of its piston, no such accidental movement of the back can occur and, when the valves 161 and 182 are closed, the back will be locked in any position to which it has been moved.

A pressure relief valve 185 (Figs. 12 and 16) which is suitably fixed to frame 41, is connected between the distributing conduit 144 and return conduit 142. This valve 185 will open, for example, if the pump is operated after the piston of a jack has been moved outwardly to its limit.

A by-pass is provided between the distributing conduit 144 and the return conduit 156. As shown in Fig. 16, this by-pass consists of a tube 186 connected to conduit 144, a tube 187 connected to tube 156 and an intervening check valve 188, which permits flow from conduit 156 to the conduit 144 to prevent the formation in the latter of a vacuum which might occur under certain conditions while the pump is idle. For example, if one should manually raise a leg rest L, this would draw out the piston of the jack and create a vacuum in its cylinder. If the valve of this leg rest cylinder is open a vacuum could be created in conduit 144 except for the described by-pass which allows oil to flow from the conduit 156 through the by-pass to the conduit 144.

In the event that either leg rest L is manually raised, while the valve of its jack cylinder is closed, the vacuum, then created, can be relieved by a by-pass from the outlet side of the valve to the return conduit, as shown diagrammatically in Fig. 16, the by-pass including a tube 189 connected to tube 177, a tube 190 connected to the return conduit 142 and an intervening check valve 191.

The diagram of Fig. 16 also shows the complete hydraulic system and will be convenient to refer to for an understanding of the operation of the invention.

Referring now to Figs. 3 and 24, the back B preferably has a prop which normally lies flat against the back of the back frame 89, as shown by full lines in Fig. 3, but can be moved at right angles thereto into the position shown by dotted lines when the back is in a horizontal position. As shown, this prop comprises a rod 192 telescoped into a tube 193. The tube has a head 194 (see also Fig. 24) which can turn on a shaft 195 fixed at its ends in brackets 196 secured to back frame 89 near the upper or outer end thereof. Normally, the tube is held against the back frame by a spring clip 197 fixed to such frame. However, when the back is lowered into the same plane as seat S, this prop may be swung downwardly 90° until head 194 abuts the back of frame 89. This prop is adjustable in the same manner as the leg rests L and has a detent 198, corresponding to the detent 124, above described, to releasably hold rod 192 in various positions of longitudinal adjustment in tube 193.

The back is also provided with a head rest H (Fig. 24), suitably fixed to a pair of arms 199, which in turn are fixed to a shaft 200. This shaft is rotatably mounted in bearings 201, fixed to the back of frame 89. A spring 202, acting between one bearing 201 and a collar 203 fixed to shaft 200, tends to move the shaft 200 in such a direction as to hold engaged serrated clutch members 204 and 205, the former being fixed to shaft 200 and the latter being fixed to the other bearing 201, whereby the head rest H may be held in various positions of angular adjustment relatively to back B.

Each elbow rest E is fixed to two arms 206, which in turn are fixed to a shaft 207, mounted near its ends to turn in two bearings 208 fixed to the back of frame 89. A spring 209, coiled around shaft 207, acts between one bearing 208 and a collar 210 fixed to the shaft with a tendency to hold engaged clutch elements 211 and 212, one fixed to the other bearing 208 and the other fixed to shaft 207. To disengage the clutch elements 211 and 212, a shaft 213, rotatably mounted in bearings on the back of frame 89, has an eccentric 214 bearing against the outer end of shaft 207. When shaft 213 is turned by means of a handle 215 fixed thereon, the eccentric will be turned to force shaft 207 inwardly far enough to disengage the clutch elements 211 and 212 and allow the elbow rest to be moved to the desired position of angular adjustment relatively to the back.

The arm rests A are preferably mounted on the seat frame 41 for convenient removal. Each is mounted on top of a plate 216 having two tongues 217 (Fig. 1) for insertion in two vertical T-slots 218 (Fig. 3) provided in the adjacent flange 43 of the frame 41. These arm rests may be removed and a table substituted therefor having tongues to fit said slots.

In operation, the occupant of the chair may control the movement of the seat S, the movement of back B and the movement of each leg rest L. Each of these elements may be moved independently of the others. It is simply necessary for the occupant to turn the valve shaft 164 by the handle 165 until the desired valve is connected to the distributing conduit 144. Then, if the element is to be raised, he operates the pump 128 by means of handle 136 to produce hydraulic pressure in the cylinder of the jack controlled by the selected valve or if the element is to be lowered he opens the release valve 145 which connects such cylinder to tank 3. Having raised or lowered one element, say for example the seat S, he may then turn the valve shaft 164 to another angular position to open another valve, say for example, that controlling the jack for raising back B. In doing this, the valve controlling the seat S will close and liquid will be retained in the seat-raising jack to hold the seat in the desired position. So, also he may turn shaft 164 further, closing the valve for the back-raising jack and opening the valve for one of the leg rest raising jacks, whereupon the latter will be raised by continued operation of pump 128 or lowered by opening the release valve 145. Each leg rest, as shown, is independently operable so that each can be positioned as desired to suit the patient. However, both leg rests could readily be operated simultaneously, if desired, as above explained in connection with Fig. 23.

With these provisions, the invention provides for a chair of normal height (Fig. 2) with the seat S horizontal or tilted rearwardly, as desired, and a back B that may be inclined to any angle to suit the occupant and leg rests L that may be independently adjusted to various inclinations. The chair may be lowered to the Fig. 1 position, in which it can be wheeled up a ramp and through a door of an automobile into the latter and then swung around into a space provided beside the driver. The occupant then faces forwardly. The seat is preferably tilted rearwardly and will then be at the same level and have the same rearward inclination as the usual automobile seat. The chair may be immobilized by applying the brakes 18 for the front wheels 11 by an attendant depressing the pedal 25 and the caster wheels 12 may be locked against swivelling by depressing the pedal 36. The chair may also be converted into a lounge by lowering the back B and raising the leg rests L, the head rest H and elbow rests E being adjusted to suit the occupant. Finally, the chair may be converted into a stretcher by lowering the back B and raising the leg rests L until they lie in the same plane as seat S. The stretcher may then be wheeled or it may be lifted by its ends, the back B having been previously locked in flat position either mechanically by bolt 106 or hydraulically, as described, and the leg rests L being held from movement above a horizontal position by the engagement of the stops 121 and 122.

The invention thus provides an improved wheel chair, wherein the various elements, seat, back and leg rests may be moved, the one independently of the other, under the control of the occupant of the chair, into various positions of adjustment.

What is claimed is:

1. A convertible chair, comprising a mobile chassis, a seat including a frame, means supporting said frame from the chassis for raising and lowering movements, a hydraulic jack mounted on the chassis and connected to the seat frame for raising the same by hydraulic pressure, a back connected to the rear of the seat frame, leg rests including frames pivotally connected to the front of the seat frame one on each side thereof, hydraulic jacks one for each leg rest and connecting each leg rest frame to the seat frame for raising the leg rest frame by hydraulic pressure, a distributing conduit, a pump mounted on the seat frame and operable by an occupant of said seat for supplying liquid under pressure to said conduit, a first control means on the seat frame operable by an occupant of said seat for selectively connecting said jacks to said conduit, whereby the jacks may be operated the one independently of the other, and a second control means on the seat frame operable by an occupant of said seat for releasing pressure from said conduit and any jack connected thereto to allow lowering of the frame that was raised by the jack.

2. The combination, as claimed in claim 1, wherein the pivotal connection between each leg rest frame and the seat frame is located on a member which is longitudinally adjustable on the seat frame and each leg rest jack is pivotally connected to one of said leg rest frames at one end and to said member at the other end.

3. A convertible chair, comprising a mobile chassis, a seat including a frame, means supporting said frame from the chassis for raising and lowering movements, a hydraulic jack mounted on the chassis and connected to the seat frame for raising the same, a back including a frame hingedly connected to the rear of the seat frame, a second hydraulic jack connected to both said frames for swinging the back frame upwardly relatively to the seat frame, leg rests including frames pivoted to the front of the seat frame one on each side thereof, third and fourth hydraulic jacks connected to the seat frame and connected one to each leg rest frame for swinging them upwardly, a distributing conduit, a pump mounted on the seat frame and operable by an occupant of said seat for supplying liquid under pressure to said conduit, a first control means on the seat frame operable by an occupant of said seat for selectively connecting said jacks to said conduit, whereby the jacks may be operated the one independently of the other, a second control means on the seat frame operable by an occupant of said seat for releasing pressure from said conduit and any jack connected thereto to allow lowering of the frame that was raised by the jack.

4. A convertible chair, comprising, a mobile chassis, a seat including a frame, means supporting the seat frame from the chassis for raising and lowering movements, a hydraulic jack mounted on the chassis and connected to said seat frame and operable by hydraulic pressure to raise the same, a back including a frame pivotally connected to the rear of the seat frame, a hydraulic jack mounted on the seat frame and connected to the back frame and operable by hydraulic pressure to swing the back frame upwardly, a distributing conduit, a pump mounted on the seat frame and operable by an occupant of said seat for supplying liquid under pressure to said distributing conduit, a plurality of branch conduits from the distributing conduit, one for each jack and each leading to one end of the cylinder of its jack, a first valve in the branch conduit for the seat-raising jack, a second valve in the branch conduit for the back-raising jack, the first and second valves being mounted on the seat frame, means on the seat frame operable by an occupant of said seat for opening said valves one at a time and when opening one to close the other, a third valve on the seat frame connected to the distributing conduit and operable when opened to release pressure from the distributing conduit and any jack that may be connected thereto, and means on the seat frame operable by an occupant of the seat for actuating the third valve.

5. The combination, as claimed in claim 4, with a tank for the hydraulic liquid, a suction conduit connecting the tank to the pump, a return conduit connecting the other end of the cylinder of the back-raising jack to the suction conduit, and a fourth valve mounted on the seat frame and interposed in the return conduit, said fourth valve being connected to the second valve for the back-raising jack to open and close simultaneously therewith.

6. A convertible chair, comprising a mobile chassis, a seat including a frame, means supporting said frame from the chassis for raising and lowering movements, a hydraulic jack mounted on the chassis and connected to the seat frame and operable by liquid under pressure to raise the same, a back connected to the rear of the seat frame, leg rests pivotally connected to the front of the seat frame one on each side thereof, jacks one for each leg rest connected between said leg rests and seat frame and operable by liquid under pressure to swing its leg rest upwardly, a fluid supply tank on the chassis, a pump mounted on the seat frame, a flexible suction conduit connecting the tank to the inlet of the pump, a distributing conduit connected to the outlet of the pump, a plurality of branch conduits leading from the distributing conduit one for each jack, a valve in each branch conduit, a return conduit connected to said tank, a normally closed release valve interposed between the distributing conduit and the return conduit, a shaft extending transversely across the seat frame, a device on an end of the shaft accessible to an occupant of the seat for turning the same, means for releasably holding said shaft in any one position of a plurality of angular positions, one for each jack valve, in each of which positions one valve is open and the others are closed, and means on the seat frame accessible to an occupant of the seat for opening said release valve.

7. A convertible chair, comprising, a mobile chassis, a seat including a frame, means movably mounted on the chassis near its rear end and means movably mounted on the chassis near its front end for respectively supporting the rear and front ends of the seat frame for raising and lowering movements, a hydraulic jack on the chassis connected to said rear-supporting means and operable by liquid under pressure to raise the rear end of the seat frame, connections between the front and rear supporting means for raising the front end of the seat frame at the same rate as the rear end, means for supplying liquid under pressure to said jack to raise the seat, means for releasing pressure fluid from the jack to lower the seat, a stop for limiting the downward movement of the front supporting means, said connections including provision for relative movement between the front and rear supporting means, and means for controlling and limiting said relative movement operable as the seat descends and after said stop arrests the front supporting means to enable such relative movement and continued movement of the rear supporting means in order to tilt said seat rearwardly.

8. The combination, as claimed in claim 7, with a stop on the chassis engageable by said control means when the front seat-supporting means reaches its upper limit to restore the control means to its initial position on continued movement of rear seat-supporting means until the rear end of the seat is raised as high as the front end thereof.

9. A convertible chair, comprising, a mobile chassis including side frames and transverse connecting members, a seat including a frame, a first cross shaft mounted at its ends in and located near the rear of said side frames, a second cross shaft mounted at its ends in said side frames and located forwardly of the rear shaft, a rear pair of levers fixed to the first cross shaft, a front pair of levers pivoted at one end on the second cross shaft and each having a slot in its side, the other ends of all the levers being pivotally connected to the seat frame one near each corner thereof and normally supporting said seat in horizontal position, a second pair of levers on the second cross shaft one adjacent each front lever, links connecting the last-named levers one to each of the rear levers, a shaft carried by the second pair of levers on the second shaft and having cranks one at each end thereof, said cranks having projecting pins engaged one in each of said slots in the front levers, a ratchet fixed to said crankshaft having two teeth located at different radial distances from the axis of the crankshaft, a pawl pivoted on the second cross shaft, a spring connecting one of the second levers on the second cross shaft to said pawl and normally holding the latter in engagement with the more distant tooth of the ratchet, said pawl normally moving with the second lever that carries it, and a stop on the chassis to limit the lowering movement of the front levers allowing the pawl to back off the more distant to the less distant ratchet tooth and the rear levers to move downwardly farther to lower the rear end of the seat frame and tilt the seat.

10. The combination, as claimed in claim 9, with a second stop on the chassis for engaging the pawl when the tilted seat is raised to its uppermost position to allow the lever that carries it to continue its movement until the seat is horizontal and thereby turn the crankshaft back to its original position, moving the ratchet upwardly to allow the pawl to engage with the more distant tooth of the ratchet.

11. In a convertible chair and stretcher, a mobile chassis, a seat including a frame, means on the chassis operable by liquid under pressure to raise the seat and operable on release of such pressure to lower the seat, a back including a frame having a first ear projecting forwardly from its lower edge toward the rear edge of the seat frame and also downwardly below the back frame, and a second ear extending downwardly and rearwardly from the lower edge of the seat frame, a link pivotally connected at one end to the forwardly extending part of the first ear and at the other end to the rearwardly extending part of the second ear, other links connecting the sides of the seat and back frames, the last-named links being disposed substantially horizontal when the back and seat are in the same plane, and the first-named links being disposed substantially vertical when the back and seat are in the same plane, and a hydraulic jack pivoted at one end to the under side of the seat frame and pivoted to the forwardly extending part of the first-named ear.

12. In a convertible chair, a mobile chassis, a seat including a frame supported therefrom, a back including a frame hingedly connected at its lower end to the rear end of the seat frame, a hydraulic jack having a cylinder pivoted to one frame and a piston rod pivoted to the other frame, a tank for liquid, a pump, a first conduit connecting the inlet of the pump to said tank below the level of liquid therein, a second conduit connecting the outlet of said pump to one end of said cylinder for producing pressure in the cylinder to swing the back frame upwardly, a third conduit connecting the other end of said cylinder to said first conduit, valves one in the second and one in the third conduit, means for simultaneously opening and closing said valves, said valves when closed preventing inflow or outflow of liquid from both ends of said cylinder, whereby to lock the back frame in any position to which it may be moved, and a release valve interconnecting the first and second conduits and operable when opened while the other valves are open to release the pressure in said cylinder and allow the back frame to swing downwardly.

13. In a convertible chair, a mobile chassis, a seat including a frame supported therefrom, a back including a frame connected to the rear end of the seat frame, a leg rest hingedly connected to the front of the seat frame, a hydraulic jack including a cylinder and piston rod pivotally connected one to the seat frame and one to the leg rest, a tank for liquid, a pump, a first conduit connecting the inlet of the pump to the tank at a location below the level of liquid therein, a second conduit connecting the outlet of the pump to the cylinder of said jack, a valve in the second conduit operable when open to admit liquid under pressure to the jack cylinder to raise the leg rest and when closed to retain the liquid in the cylinder and maintain the leg rest in the position to which it has been moved, a third conduit connecting the second and first conduits, a release valve in the third conduit, and a by-pass around the first-named valve extending from the second conduit at a point between the first-named valve and jack cylinder to the first conduit, and a check valve in said by-pass permitting flow from the first conduit to the jack cylinder to prevent the formation of a vacuum in the jack cylinder in the event that the leg rest is manually raised.

References Cited in the file of this patent

UNITED STATES PATENTS

| | | |
|---|---|---|
| 1,591,529 | Guerber | July 6, 1926 |
| 1,984,311 | Lamar et al. | Dec. 11, 1934 |
| 2,217,783 | Bell | Oct. 15, 1940 |
| 2,422,892 | Forbes et al. | June 24, 1947 |
| 2,520,455 | Clachko | Aug. 29, 1950 |
| 2,572,149 | Hind et al. | Oct. 23, 1951 |
| 2,587,068 | Sanders | Feb. 26, 1952 |
| 2,632,898 | Pardoe | Mar. 31, 1953 |
| 2,672,917 | Collura | Mar. 23, 1954 |
| 2,682,913 | Schiede | July 6, 1954 |
| 2,694,437 | Glaser | Nov. 16, 1954 |
| 2,728,936 | Hodges et al. | Jan. 3, 1956 |
| 2,729,272 | Lidge et al. | Jan. 3, 1956 |
| 2,753,920 | Ranger | July 10, 1956 |